(12) United States Patent
Patterson et al.

(10) Patent No.: US 11,926,304 B2
(45) Date of Patent: Mar. 12, 2024

(54) SYSTEM AND METHOD FOR PROVIDING A BRAKE FADE INDICATION

(71) Applicant: Ford Global Technologies, LLC, Dearborn, MI (US)

(72) Inventors: David S. Patterson, Lake Orion, MI (US); Thomas Svensson, Leichlingen (DE); Rob Eaton, Bloomfield, MI (US)

(*) Notice: Subject to any disclaimer, the term of this patent is extended or adjusted under 35 U.S.C. 154(b) by 393 days.

(21) Appl. No.: 17/344,434

(22) Filed: Jun. 10, 2021

(65) Prior Publication Data
US 2022/0396248 A1    Dec. 15, 2022

(51) Int. Cl.
| | |
|---|---|
| *B60T 17/22* | (2006.01) |
| *B60K 35/00* | (2006.01) |
| *B60T 8/32* | (2006.01) |
| *B60T 8/40* | (2006.01) |

(52) U.S. Cl.
CPC ............ *B60T 8/4081* (2013.01); *B60K 35/00* (2013.01); *B60T 8/326* (2013.01); *B60T 17/221* (2013.01); *B60K 2370/151* (2019.05); *B60T 2250/00* (2013.01); *B60T 2270/82* (2013.01); *B60T 2270/88* (2013.01)

(58) Field of Classification Search
CPC ...... B60T 8/4081; B60T 8/326; B60T 17/221; B60T 2250/00; B60T 2270/82; B60T 2270/88; B60K 35/00; B60K 2370/151
See application file for complete search history.

(56) References Cited

U.S. PATENT DOCUMENTS

| | | |
|---|---|---|
| 6,398,319 B1 | 6/2002 | Wilson et al. |
| 10,464,536 B2 | 11/2019 | Akita et al. |
| 2020/0062233 A1 | 2/2020 | Yu |
| 2021/0284113 A1* | 9/2021 | Schnur ..................... B60T 8/92 |

FOREIGN PATENT DOCUMENTS

WO    2020025187 A1    2/2020

* cited by examiner

*Primary Examiner* — Jacob M Amick
(74) *Attorney, Agent, or Firm* — Burr & Forman LLP

(57) ABSTRACT

A vehicle control system for controlling braking in a vehicle may include a braking system operably coupled to one or more wheels of the vehicle to provide brake inputs to the one or more wheels responsive to a torque request generated based on pedal position. The system may further include a pedal position sensor operably coupled to a brake pedal to determine the pedal position responsive to actuation of the brake pedal by a driver of the vehicle, a pedal feel simulator operably coupled to the brake pedal to provide tactile feedback to the driver via a pedal force applied to the brake pedal, an accelerometer for determining a rate of velocity reduction of the vehicle during the actuation of the brake pedal, and a feedback augmenter operably coupled to the pedal feel simulator to provide a pedal force offset to increase the pedal force provided to the brake pedal based on the rate of velocity reduction.

19 Claims, 8 Drawing Sheets

SYSTEM AND METHOD FOR PROVIDING A BRAKE FADE INDICATION

TECHNICAL FIELD

Example embodiments generally relate to vehicle control technology and, more particularly, relate to a system and method for providing a brake fade indication for electrically assisted brakes.

BACKGROUND

"Brake fade" may occur when an increase in the thermal energy of a braking event increases to a point causing a reduction in brake torque output. For a conventional brake system, the driver will feel force feedback through the brake pedal. Accordingly, during brake fade, the driver may feel the need to press the brake pedal deeper into the available pedal stroke. In conventional braking systems, the increased travel will achieve a condition known as "runout" where the pedal force increases non-linearly. This is related to an increase in the locking pressure, which requires higher pressure to achieve the same rate of velocity reduction. The phenomenon is experienced by the driver as tactile feedback.

Meanwhile, electrically assisted brakes, such as those that employ electronic boost braking (EBB), disconnect the brake pedal from the application of pressure to the calipers of the brake system. Instead, the EBB system employs a linear actuator to apply requested pressure based on the driver's input at the brake pedal. As the brake fade phenomenon begins to occur, the EBB system will continue to apply the pressure requested, but the driver may not notice the runout condition mentioned above. The driver may then continue to apply more pressure and pedal travel input to the brake pedal. Thus, while an EBB system typically delivers brake pressure that increases until full system pressure is delivered based on the brake pedal travel applied, the EBB system may not normally provide the same type of feedback that a conventional brake system would produce through the brake pedal.

Since EBB systems employ electronic braking, a pedal simulator may be used to try to simulate a similar feel to that of conventional brake systems. However, these simulations are not always good at approximating the same outputs that would be felt in conventional braking systems. The occurrence of brake fade is one example of a situation where the simulation may not provide the same tactile feedback of the conventional braking system. The driver may then not be aware of the brake fade phenomenon and may not operate the brake pedal in the same way that would otherwise be expected.

Accordingly, it may be desirable to define a strategy for providing a brake fade indication that can be implemented to provide a more satisfying user experience for drivers.

BRIEF SUMMARY OF SOME EXAMPLES

In accordance with an example embodiment, a vehicle control system for controlling braking in a vehicle may be provided. The vehicle control system may include a braking system operably coupled to one or more wheels of the vehicle to provide brake inputs to the one or more wheels responsive to a torque request generated based on pedal position. The vehicle control system may further include a pedal position sensor operably coupled to a brake pedal to determine the pedal position responsive to actuation of the brake pedal by a driver of the vehicle, a pedal feel simulator operably coupled to the brake pedal to provide tactile feedback to the driver via a pedal force applied to the brake pedal, an accelerometer for determining a rate of velocity reduction of the vehicle during the actuation of the brake pedal, and a feedback augmenter operably coupled to the pedal feel simulator to provide a pedal force offset to increase the pedal force provided to the brake pedal based on the rate of velocity reduction.

In another example embodiment, a method of providing a brake fade indication for a vehicle may be provided. The method may include receiving an indication of pedal position responsive to actuation of a brake pedal of a braking system, receiving a brake fade indication generated based on a rate of velocity reduction of the vehicle, and generating a pedal force input to the brake pedal to provide tactile feedback to a driver of the vehicle. The pedal force input may be generated based on a pedal force offset associated with the brake fade indication.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
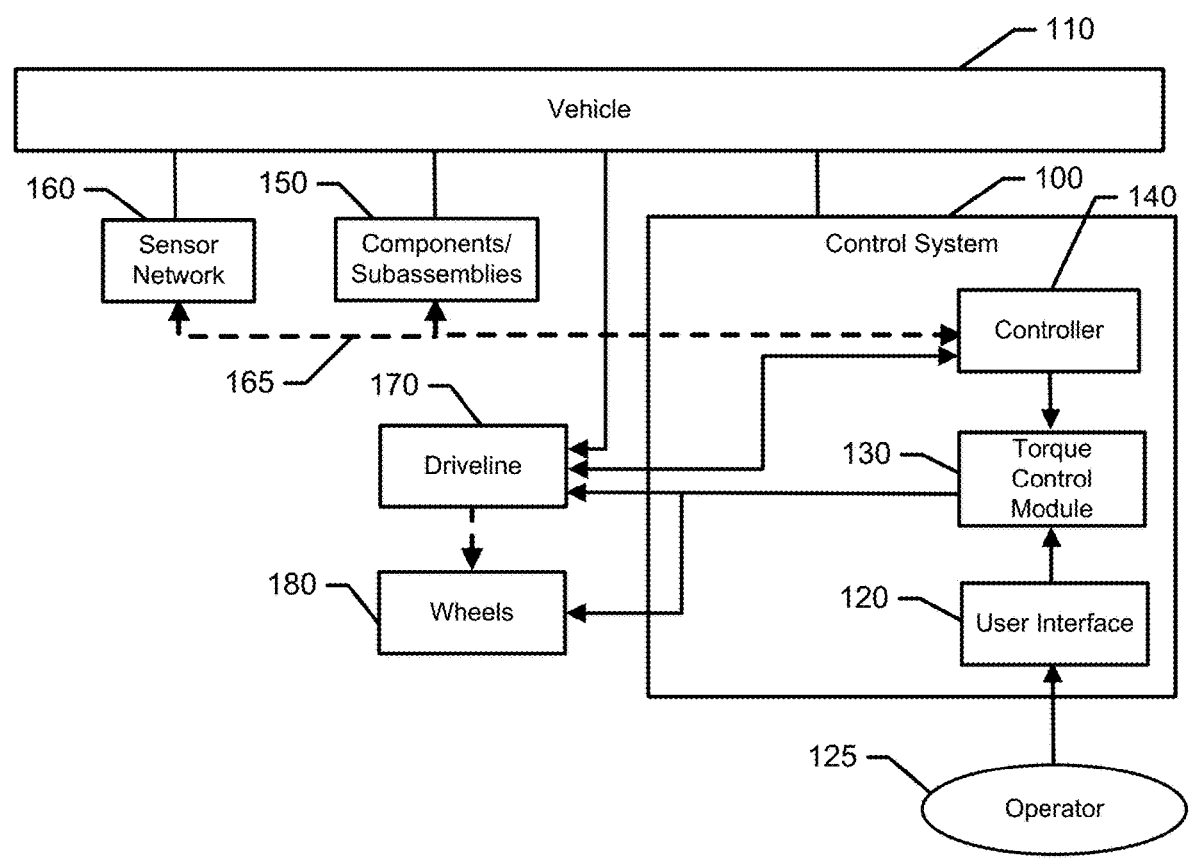
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to define strategies that enable pedal feel to be more like that of a conventional brake system in relation to the brake fade phenomenon. In this regard, because pedal force is normally only related to travel through a pedal feel simulator that is constant regardless of downstream changes in the brake system, feedback (at least relative to the feedback that is normal and feels intuitive for conventional braking systems) can be provided. Example embodiments may address this issue by providing a brake fade indication that can be used to enhance the feedback that is provided to the driver.

In this regard, for example, a pedal simulator may be provided with a feedback augmenter of an example embodiment to improve the feedback provision capability. The feedback augmenter within an EBB system may provide the means by which to tune a desired rate of velocity reduction versus pedal travel (RVRvT) curve to match a driver's input request. The driver may then apply the brake to a desired travel, which may be converted into a torque request and eventually into a pressure request that more closely resembles a conventional braking system. The feedback augmenter may provide an input to simulate pedal feel for a given effort in a pedal feel simulator (PFS) and define the relationship between pedal travel and pedal force for the vehicle. By using the PFS and the RVRvT tuning, it may be possible to develop a tactical feedback system that does not affect the everyday braking feel, but does support an increased force feedback as the vehicle goes deeper into brake fade (e.g., during track performance). This is different than conventional systems that may try to use the PFS to achieve a higher effort at longer travel, since example embodiments are pressure controlled and do not interfere with non-brake fade pedal feel at the longer travels.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals and the steering wheel (or hand wheel). The pedals may include a brake pedal and an accelerator pedal pivotally mounted to the floor of the vehicle 110, and operable by an operator 125. The brake pedal may generally be used to provide inputs for control of braking torque, and the accelerator pedal may be used to provide inputs for control of propulsive torque. However, the normal mode of operation may not be desirable for all cases. Moreover, selectable other modes of operation, including one or more off-road driver assistance modes, parking modes, turn assist modes, braking assist modes, etc., may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include a brake assist mode, in which brake fade feedback may be initiated as described in greater detail below.

Of note, although the term brake assist mode will generally be referred to herein as being the mode in which example embodiments are performed, the name of the mode in which example embodiments may be applied is not important, and certainly not limiting. In this regard, other, or any other mode in which the functionality described herein is applied, are also possible. Moreover, example embodiments may be programmed to operate by default and therefore be the normal (or only) mode of operation in some cases.

The control system 100 of example embodiments may also include the torque control module 130, which may be part of or otherwise operably coupled to a controller 140. The torque control module 130 may be configured to determine positive torque (e.g., propulsive torque) and/or negative torque (e.g., brake torque, regenerative torque, etc.) to be applied to the wheels 180, individually, in pairs or collectively (e.g., depending on driveline state and/or vehicle type) as described herein based on inputs from any or all of the controller 140, the user interface 120 or other components of the vehicle 110. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, the steering wheel of the vehicle, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. In some cases, the brake assembly may include an electric brake boost (EBB) system, which uses electric brake boosters to sense driver input and reduce the amount of pedal pressure needed for braking. The propulsion system may include a gas engine, electric motor, or any other suitable propulsion device.

The controller 140 and/or torque control module 130 may be configured to determine positive and negative torque inputs for provision to components of a driveline 170 (e.g., driveshaft, differential(s), axle shaft(s), etc.) and wheels 180 of the vehicle 110. Thus, for example, the torque control module 130 may determine positive torque inputs for provision to the propulsion system to apply propulsive torque to the wheels 180 of the wheel assembly of the vehicle 110 via the driveline 170, and determine negative torque inputs for provision to the wheels 180 in the form of braking torque, regenerative torque, or the like. Moreover, one or more corresponding sensors of the sensor network 160 that may be operably coupled to the brake assembly and/or the wheel assembly may provide information relating to brake torque, brake torque rate, vehicle velocity, vehicle acceleration, individual wheel speeds, front/rear wheel speeds, vehicle pitch, etc. Other examples of the components or subassemblies 150 and/or corresponding sensors of the sensor network 160 may provide information relating to yaw, lateral G force, steering wheel angle, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 (e.g., based on mode selection, brake pressure, pedal position (for the brake pedal or the accelerator pedal), etc.) relative to control of various aspects of operation of the vehicle 110 and then be configured to use the information received in association with the execution of one or more control algorithms that may be used to provide instructions to the torque control module 130 in order to control application of positive and negative torque to the wheels of the wheel assembly of the vehicle 110.

In an example embodiment, the operator 125 may use the user interface 120 to select the brake assist mode. However, as noted above, mode selection is not required, and the functions described herein may be normally applied regardless of any mode selection in some embodiments. The user interface 120 may be embodied by an interactive display in the vehicle 110, and may therefore be a soft switch provided on the display. However, in other examples, the user interface 120 may include a hard switch, a button, key, or other selectable operator located in the cockpit of the vehicle 110. In some embodiments, the user interface 120 may also include the brake pedal and accelerator pedal as well. However, the brake pedal and accelerator pedal may alternatively be considered specific parts of the components or subassemblies 150 and information relating to position and pressure for the brake pedal may be provided by corresponding sensors of the sensor network 160. Selection of the brake assist mode may correspondingly activate the torque control module 130 to provide the automated brake fade feedback (and adjustment) described herein based on information provided by the components or subassemblies 150 and/or corresponding sensors of the sensor network 160. More specifically, selection of the brake assist mode may enable control of brake fade feedback capabilities based on pedal position and brake pressure inputs detected by the sensor network 160 (e.g., associated with the brake pedal and brake pressure).

As noted above, when the torque control module 130 is active, outputs of the torque control module 130 may be provided to components of the driveline 170 of the vehicle 110. The controller 140 may therefore receive information to enable the controller 140 to determine a state of the driveline 170 of the vehicle 110, or the specific driveline characteristics for the type of vehicle involved may be programmed into the algorithms that are executable by the controller 140. The driveline 170 may include front and rear axles and various drive components for the front and rear axles and/or the components that provide coupling therebetween. Thus, for example, the driveline 170 may include a differential (e.g., a front differential for a front wheel drive vehicle) and gears and/or clutch components that operably couple the front and rear axles (and/or their driving components). In some examples, such as when the vehicle 110 is a battery electric vehicle (BEV), the driveline 170 may include individual electric motors for either each axle or even each wheel.

Figure 2:
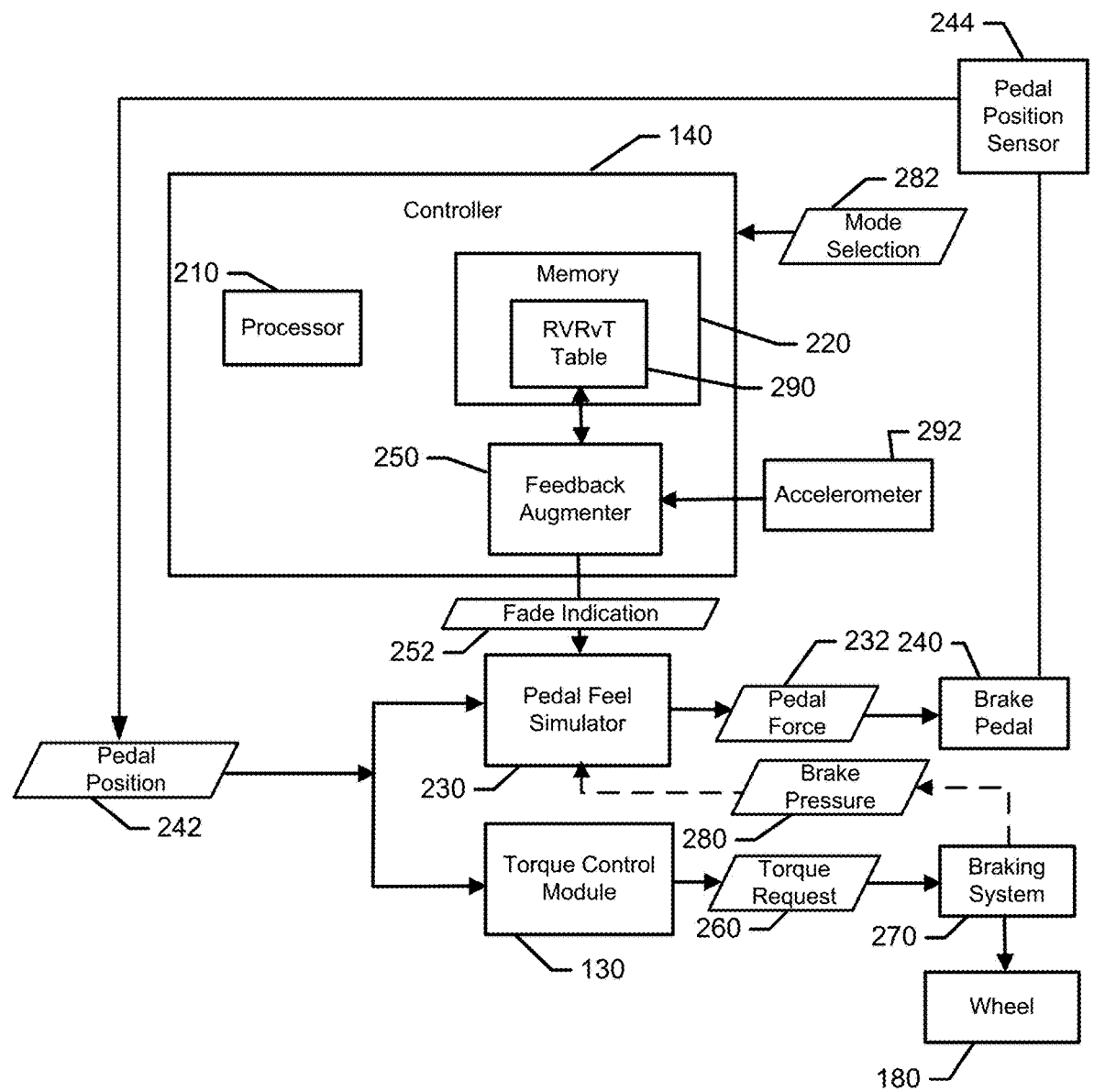
FIG. 2 illustrates a block diagram of some components of the vehicle control system of FIG. 1 in accordance with an example embodiment.

Referring now to FIG. 2, operation of the controller 140 and the torque control module 130 will be described in greater detail. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received/generated regarding specific conditions of vehicle components. The control algorithms may therefore execute various functions based on the information received, and generate outputs to drive the control of torque applied at the wheels of the vehicle 110 (e.g., individually or in pairs). The torque control module 130 may itself be a control algorithm, or may include control algorithms in the form of functional modules (or submodules) configured to perform specific functions for which they are configured relating to control of the vehicle 110 in the manner described herein. Thus, for example, the controller 140 may actually function as the torque control module 130 responsive to executing the control algorithms. However, in other cases, the torque control module 130 may be a component or module of the controller 140, or an entirely separate component (e.g., including its own corresponding processing circuitry).

In an example embodiment, the torque control module 130 may include or otherwise cooperate with a pedal feel simulator 230 that provides tactile feedback in the form of pedal force 232 to a brake pedal 240 of the vehicle 110 based on pedal position 242. Meanwhile, a pedal position sensor 244 (e.g., of the sensor network 160) may detect the pedal position 242 of the brake pedal 240 to indicate at which point the brake pedal 240 is currently located along the full range of motion of the brake pedal 240 (e.g., between opposing states of fully depressed and not depressed at all).

Figure 3A:
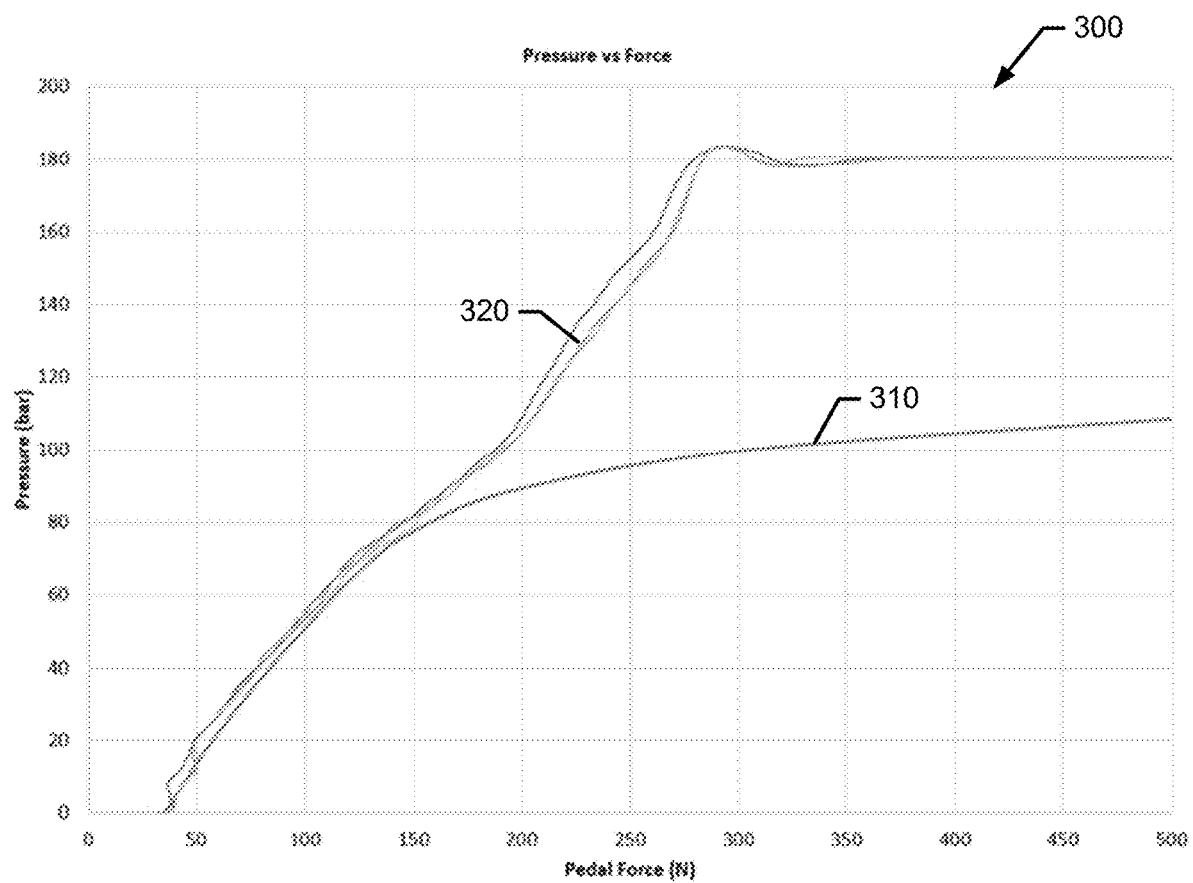
FIG. 3A illustrates a plot of pressure vs pedal force for conventional and electronic braking systems.

FIG. 3A illustrates a plot 300 of pressure (in bar) vs pedal force (in Newtons (N)) for a conventional brake system, and for an EBB brake system. Curve 310 illustrates pressure vs pedal force for the conventional brake system, and curve 320 illustrates pressure vs pedal force the EBB brake system. As shown in curve 310, once about 80 bar of output pressure (or brake pressure) is reached for the conventional brake system, there is no more boost from vacuum in the conventional brake system. This lack of boost means that for more driver push on the brake pedal 240, there will not be much additional brake pressure added, and this is experienced by the driver as runout. Meanwhile, for curve 320, the EBB brake system continues to provide output pressure, since more boost is possible, all the way up to a pressure of 180 bar. As noted above, the lack of any runout indication may lead to deeper fade and higher temperatures in the brake system.

Figure 3B:
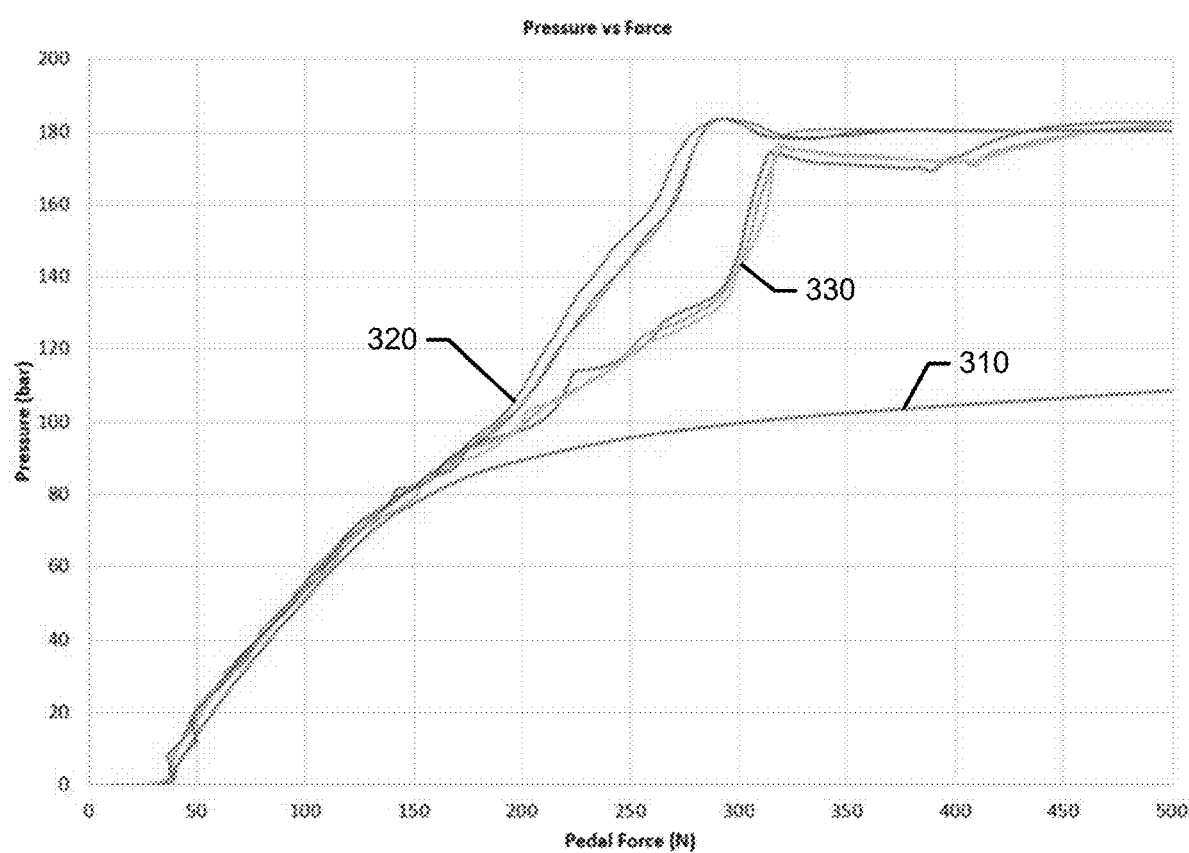
FIG. 3B illustrates a plot of pressure vs pedal force for example embodiments added to the plot of FIG. 3A.

To address the problem of a lack of runout, a fade notification feature may be added as shown in FIG. 2. Accordingly, example embodiments may employ a feedback augmenter 250, which may be programmed to provide a fade indication 252 or notification that can be used to provide tactile feedback to the driver that more closely simulates the conventional brake system feel of runout, to demand increased pedal travel for a given pressure or rate of velocity reduction. In some cases, as discussed below, the fade indication 252 may be provided as a pressure offset to increase the pedal force 232 transmitted through the brake pedal 240 to the driver so that the driver will provide increased pedal travel for the same rate of velocity reduction. FIG. 3B illustrates curve 330 (between curves 310 and 320), which illustrates performance of example embodiments employing the feedback augmenter 250.

Referring still to FIG. 2, normal operation of the torque control module 130 for braking operations may include the generation of a torque request 260 that is provided to the braking system 270 (e.g., friction brakes or local actuators at respective ones of the wheels 180) that in turn applies braking forces to the wheel or wheels 180 of the vehicle 110 at a pressure prescribed based on the torque request 260. As noted above, the pedal feel simulator 230 then provides tactile feedback to the operator via the brake pedal 240 based on the pedal position 242 in the form of pedal force 232. In this regard, various relationships between pedal force 232, pedal travel (as indicated by pedal position 242), rate of velocity reduction, and brake pressure 280 may exist, and should be appreciated.

Figure 4:
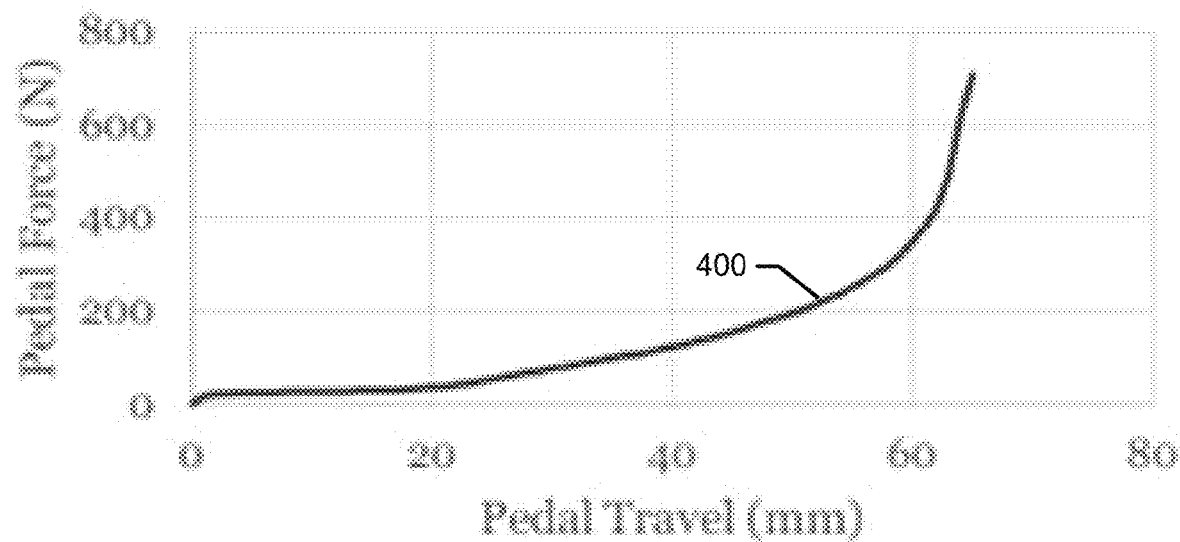
FIG. 4 illustrates a plot of pedal force vs pedal travel without augmentation of an example embodiment.

FIG. 4 illustrates a nominal pedal force vs pedal travel plot for the pedal feel simulator 230. In this regard, curve 400 illustrates the performance of the pedal feel simulator 230 without any input from the feedback augmenter 250. In some cases, provision of the fade notification feature may only be desired at speed or operational ranges that are not in the normal daily driving range. Thus, it may be desirable to leave the curve 400 in place for normal daily driving, and only have the feedback augmenter 250 operate in track or other high performance conditions. Mode selection 282 (e.g., made via user interface 120) may be responsible for enabling the feedback augmenter 250 in addition to specific trigger conditions or ranges described below.

Figure 5:
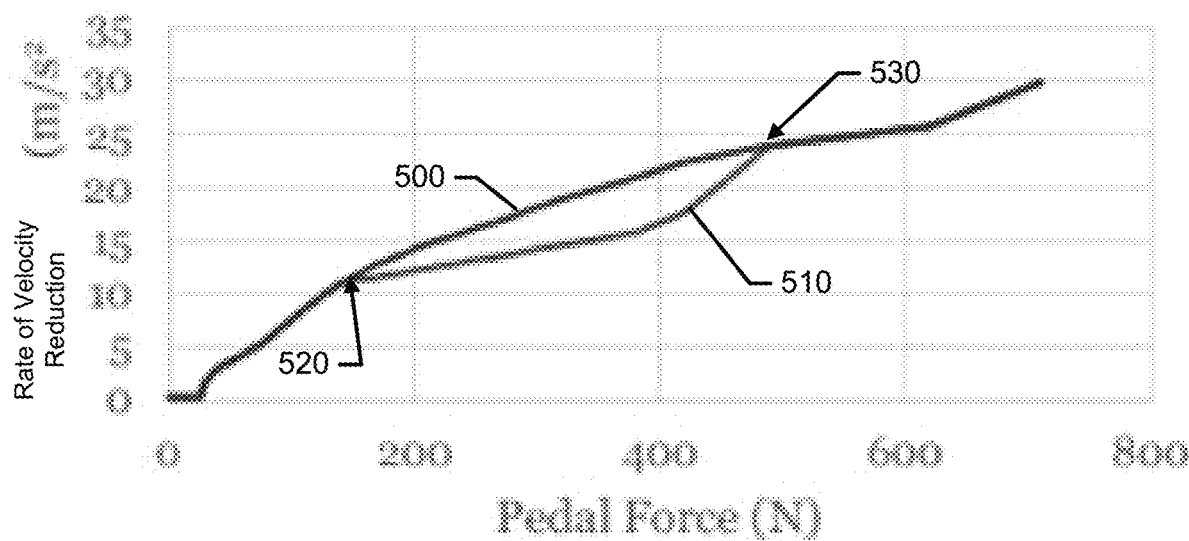
FIG. 5 illustrates a plot of rate of velocity reduction versus pedal force both with and without feedback augmentation in accordance with an example embodiment.

FIG. 5 illustrates a plot of rate of velocity reduction vs pedal force, and FIG. 6 illustrates a plot of pressure vs pedal force both with and without operation of the feedback augmenter 250. FIG. 5 shows a normal curve 500 for rate of velocity reduction vs pedal force, and a modified curve 510 due to operation of the feedback augmenter 250. Similarly, FIG. 6 shows a normal curve 600 for pressure vs pedal force, and a modified curve 610 due to operation of the feedback augmenter 250.

Figure 6A:
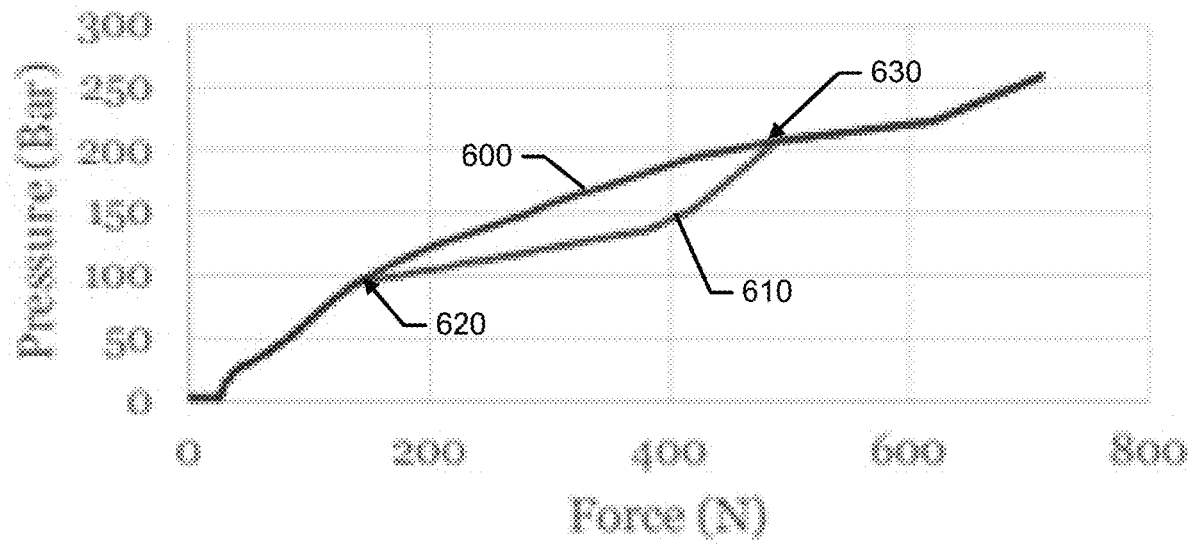
FIG. 6A illustrates a plot of rate of brake pressure versus pedal force both with and without feedback augmentation in accordance with an example embodiment.
Figure 6B:
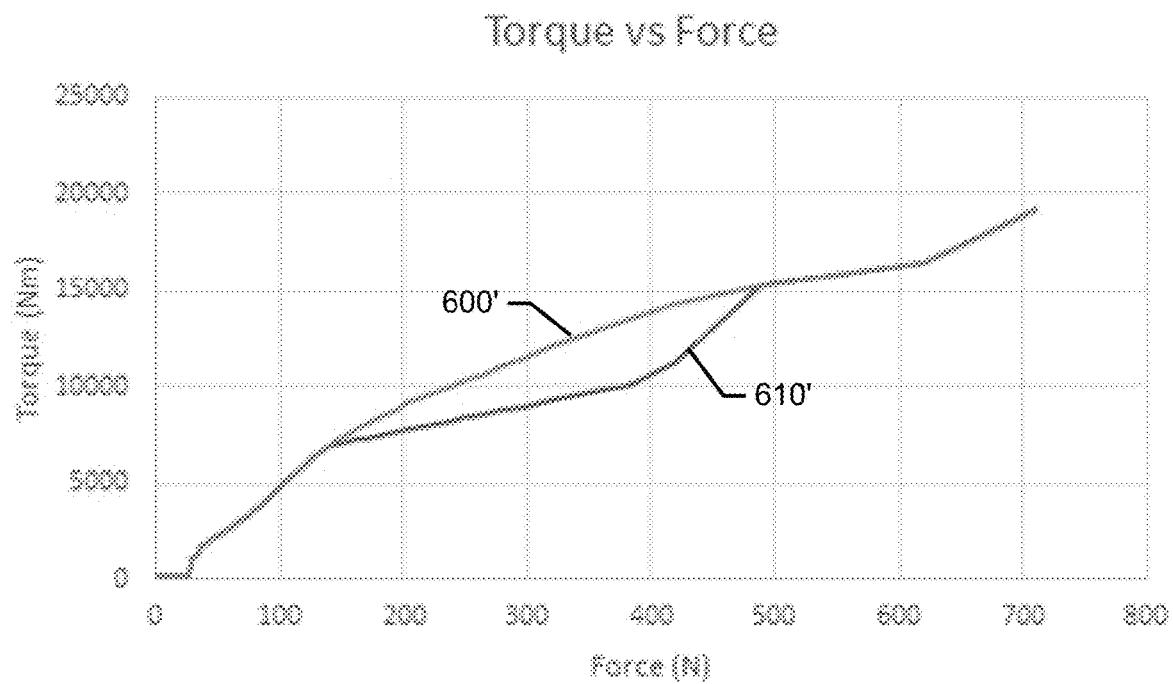
FIG. 6B illustrates a plot of rate of torque versus pedal force both with and without feedback augmentation in accordance with an example embodiment.

As noted above, to avoid any impact on normal daily driving conditions, the feedback augmenter 250 may be programmed to define a threshold or trigger 520 or 620 at which operation thereof commences. A cutoff threshold 530 or 630 may also be defined where operation of the feedback augmenter 250 stops. Moreover, the feedback augmenter 250 may be configured to operate such that, as the pressure to maintain a given rate of velocity reduction increases due to brake fade, the threshold or trigger 520 or 620 is initially met in a region at which it is desired to induce more pedal travel for a given pressure or rate of velocity reduction. In the examples of FIGS. 5, 6A and 6B, the trigger 520 or 620 occurs at about 100 bar of pressure or 150 N of pedal force, which correlates to a rate of velocity reduction of about 11 m/s² in this example. A slope of about 0.02 m/s²/N is then employed for curve 510 until about 400 N of pedal force is reached at the cutoff threshold 530. Thereafter, operation quickly returns to the normal curve 500 or 600 so that the full pressure of the EBB system is achieved by 500 N.

When pressure required to maintain a given rate of velocity reduction increases due to brake fade, the threshold for increased pressure to compensate for the loss of rate of velocity reduction is met. When met, the pressure request that would normally be provided is artificially reduced by the feedback augmenter 250 (via the fade indication 252). The fade indication 252 may then cause the driver to press with more travel on the brake pedal 240 to make up for the additional loss in rate of velocity reduction. Because of the aforementioned pedal force vs pedal travel relationship of the pedal feel simulator 230, there will be an increase in the force communicated to the driver via the brake pedal 240 as shown in FIG. 6A. This increase in force will cause the driver to need to exert additional force on the brake pedal 240 to get the same rate of velocity reduction otherwise expected. As noted above, the pressure subtraction of the fade indication 252, which causes increased travel (and therefore force) on the brake pedal 240 to be generated by the pedal feel simulator 230, will begin to be reduced at about 400 N, and will return to normal by 500 N. Notably, in the context of FIG. 6A, the term "pressure" is the hydraulic pressure applied to the brake pads to produce a negative torque at the wheels 180. However, example embodiments may also apply to brake-by-wire systems in which, for example, the term "pressure" may more generally be replaced by the term "torque" or "torque request". Thus, for example, a torque request at the wheels 180 may be provided by hydraulic pressure, mechanical screw, magnetic or any other means of creating a braking torque at the wheels 180. FIG. 6B illustrates an example showing a plot of torque versus force to illustrate a normal curve 600' for torque vs pedal force, and a modified curve 610' due to operation of the feedback augmenter 250.

In order to achieve tactile force feedback as desired, example embodiments may employ a rate of velocity reduction vs travel (RVRvT) table 290. Any or all of the plots described above (or data tables associated therewith) may also be employed to obtain any desirable output parameter for a given input parameter or set of parameters from the plots (or data tables). Thus, the RVRvT table 290 may be replaced with or augmented with any or all of the other plots of FIGS. 4-6 in some cases. The feedback augmenter 250 may be configured to reference the RVRvT table 290 (and/or any other plots/tables) to determine the fade indication 252 that is to be provided as a pressure offset to the normal output of the pedal feel simulator 230. In this regard, an accelerometer 292 may provide a rate or velocity reduction input to the feedback augmenter 250. The feedback augmenter 250 may reference the RVRvT table 290 based on the rate of velocity reduction input to determine the fade indication 252, based on a modified pedal travel distance required for the same amount of rate of velocity reduction.

Figure 7:
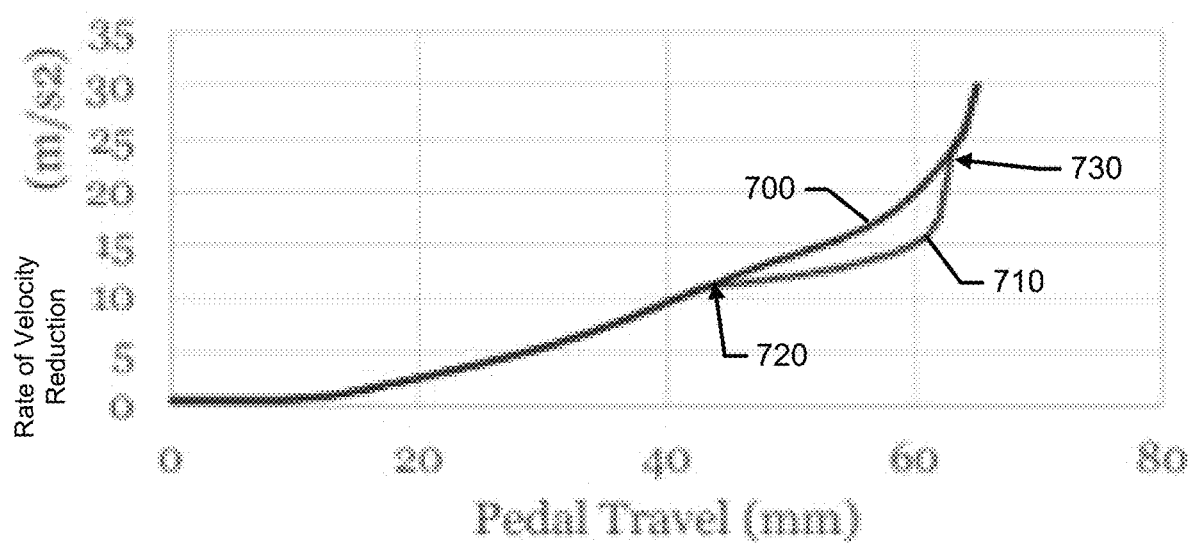
FIG. 7 illustrates a plot of rate of velocity reduction versus pedal travel both with and without feedback augmentation in accordance with an example embodiment.

FIG. 7 illustrates a plot of rate of velocity reduction vs travel that may result from operation of the RVRvT table 290 relative to operation without. In this regard, curve 700 shows an unmodified or normal operating curve, and curve 710 illustrates the modified curve 710 caused by operation of the feedback augmenter 250 to generate the pressure offset of the fade indication 252, which requires more pedal travel for a given rate of velocity reduction within the operating range of the feedback augmenter 250. The modified curve 710 extends between a trigger value 720 and a cuttoff value 730 to define the operating range of the feedback augmenter 250. Thus, the range below about 45 mm of pedal travel (for this example), where less than 11 m/s$^2$ of rate of velocity reduction is typically required is unaffected by operation of the feedback augmenter 250. Instead, only areas above this threshold where brake fade occurs are affected by operation of the feedback augmenter 250.

Example embodiments meet the desire to avoid impact daily driving, while still providing feedback during fade. The specific implementation details will typically depend on the vehicle type and corresponding operational or performance metrics associated therewith. However, the RVRvT table 490 may be tunable so that optimized operation can be achieved for each vehicle type. Example embodiments may use locking pressure increases that are not initiated during non-fade conditions, but may otherwise be applicable to any EBB system or brake-by-wire system that disconnects the pedal feel from the hydraulic system downstream of the boost system.

Figure 8:
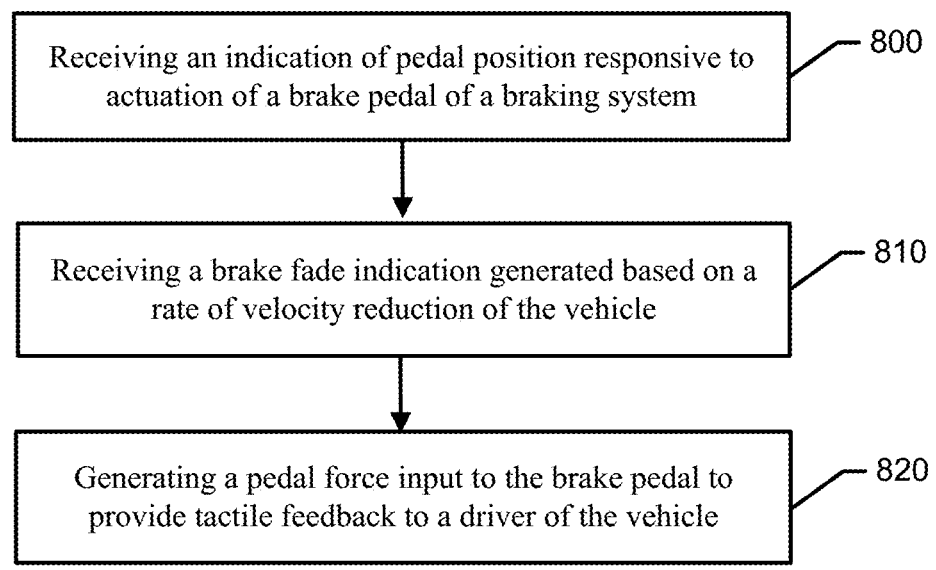
FIG. 8 illustrates a method of controlling a vehicle braking system in accordance with an example embodiment.

In an example embodiment, the driver may provide an input into the system by pressing the brake pedal 240 and, if mode selected or threshold criteria are met, a method of providing a brake fade indication may be executed. FIG. 8 illustrates a block diagram of one example of such a method. The method may include receiving an indication of pedal position responsive to actuation of a brake pedal of a braking system at operation 800. The method may further include receiving a brake fade indication generated based on a rate of velocity reduction of the vehicle at operation 810. The method may further include generating a pedal force input to the brake pedal to provide tactile feedback to a driver of the vehicle at operation 820. In some embodiments, The method may further include receiving an indication of brake pressure applied by the braking system. In some embodiments, the pedal force offset may only be applied between a trigger value and a cutoff value. As an example, the trigger value may be the rate of velocity reduction reaching about 11 m/s$^2$ and the cutoff value may occur when the rate of velocity reduction reaches about 23 m/s$^2$. In some embodiments, generating the pedal force input may include employing a rate of velocity reduction versus pedal travel table to generate the pedal force offset based on the rate of velocity reduction. The pedal force offset may be determined based on force versus travel characteristics of the vehicle.

Example embodiments may therefore also include a vehicle control system for controlling braking in a vehicle. The vehicle control system may include a braking system operably coupled to one or more wheels of the vehicle to provide brake inputs to the one or more wheels responsive to a torque request generated based on pedal position. The vehicle control system may further include a pedal position sensor operably coupled to a brake pedal to determine the pedal position responsive to actuation of the brake pedal by a driver of the vehicle, a pedal feel simulator operably coupled to the brake pedal to provide tactile feedback to the driver via a pedal force applied to the brake pedal, an accelerometer for determining a rate of velocity reduction of the vehicle during the actuation of the brake pedal, and a feedback augmenter operably coupled to the pedal feel simulator to provide a pedal force offset to increase the pedal force based on the rate of velocity reduction. Notably, in some examples, the torque request may further be generated based on a combination of brake pedal force and brake pedal travel (or position).

The vehicle control system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the system may further include a torque control module that is operably coupled to the braking system to provide the torque request based on the pedal position. In an example embodiment, the feedback augmenter may provide the pedal force offset as a fade indication to the driver tactilely. In some cases, the fade indication may be further provided visually to the driver via a user interface. In an example embodiment, the feedback augmenter applies the pedal force offset between a trigger value and a cutoff value. In some cases, the trigger value may be reached when the rate of velocity reduction is about 11 m/s$^2$ and the cutoff value may be reached when the rate of velocity reduction is about 23 m/s$_2$. In an example embodiment, the trigger value may be a brake pressure of about 100 bar and the cutoff value may be the brake pressure being about 200 bar. In some cases, the pedal force offset may have a slope of about 0.02 m/s2/N from the trigger value to about 400 N. In an example embodiment, the pedal force offset may be reduced after about 400 N to reach zero by about 500 N. In some cases, the system may include a rate of velocity reduction versus pedal travel table, and the feedback augmenter may employ the rate of velocity reduction versus pedal travel table to generate the pedal force offset based on the rate of velocity reduction. In an example embodiment, the pedal force offset may be determined based on force versus travel characteristics of the vehicle. In some cases, the force versus travel characteristics may include pedal force versus pedal travel. In an example embodiment, the force versus travel characteristics may be tunable based on type information associated with the vehicle. In some cases, the feedback augmenter may be operable based on a mode selection made by the driver.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system for controlling braking in a vehicle, the system comprising:
   a braking system operably coupled to one or more wheels of the vehicle to provide brake inputs to the one or more wheels responsive to a torque request generated based on pedal position;
   a pedal position sensor operably coupled to a brake pedal to determine the pedal position responsive to actuation of the brake pedal by a driver of the vehicle;
   a pedal feel simulator operably coupled to the brake pedal to provide tactile feedback to the driver via a pedal force applied to the brake pedal;
   an accelerometer for determining a rate of velocity reduction of the vehicle during the actuation of the brake pedal; and
   a feedback augmenter operably coupled to the pedal feel simulator to provide a pedal force offset to increase the pedal force provided to the brake pedal based on the rate of velocity reduction,
   wherein the feedback augmenter applies the pedal force offset between a trigger value and a cutoff value.

2. The system of claim 1, further comprising a torque control module operably coupled to the braking system to provide the torque request based on the pedal position.

3. The system of claim 2, wherein the feedback augmenter provides the pedal force offset as a fade indication to the driver tactilely.

4. The system of claim 3, wherein the fade indication is further provided visually to the driver via a user interface.

5. A vehicle control system for controlling braking in a vehicle, the system comprising:
   a braking system operably coupled to one or more wheels of the vehicle to provide brake inputs to the one or more wheels responsive to a torque request generated based on pedal position;
   a pedal position sensor operably coupled to a brake pedal to determine the pedal position responsive to actuation of the brake pedal by a driver of the vehicle;
   a pedal feel simulator operably coupled to the brake pedal to provide tactile feedback to the driver via a pedal force applied to the brake pedal;
   an accelerometer for determining a rate of velocity reduction of the vehicle during the actuation of the brake pedal; and
   a feedback augmenter operably coupled to the pedal feel simulator to provide a pedal force offset to increase the pedal force provided to the brake pedal based on the rate of velocity reduction,
   wherein the pedal force offset is determined based on force versus travel characteristics of the vehicle, and
   wherein the force versus travel characteristics comprise pedal force versus pedal travel.

6. The system of claim 1, wherein the trigger value comprises the rate of velocity reduction being about 11 $m/s^2$ and the cutoff value comprises the rate of velocity reduction being about 23 $m/s^2$.

7. The system of claim 1, wherein the trigger value comprises a brake pressure of about 100 bar or a brake torque of about 6500 Nm and the cutoff value comprises the brake pressure being about 200 bar or the brake torque being about 15000 Nm.

8. The system of claim 1, wherein the pedal force offset has a slope of about 0.02 $m/s2/N$ from the trigger value to about 400 N.

9. The system of claim 8, wherein the pedal force offset reduces after about 400 N to reach zero by about 500 N.

10. The system of claim 1, further comprising a rate of velocity reduction versus pedal travel table, and
    wherein the feedback augmenter employs the rate of velocity reduction versus pedal travel table to generate the pedal force offset based on the rate of velocity reduction.

11. The system of claim 1, wherein the pedal force offset is determined based on force versus travel characteristics of the vehicle.

12. The system of claim 5, wherein the feedback augmenter applies the pedal force offset between a trigger value and a cutoff value.

13. The system of claim 5, wherein the force versus travel characteristics are tunable based on type information associated with the vehicle.

14. The system of claim 1, wherein the feedback augmenter is operable based on a mode selection made by the driver.

15. A method of providing a brake fade indication for a vehicle, the method comprising:
    receiving an indication of pedal position responsive to actuation of a brake pedal of a braking system;
    receiving a brake fade indication generated based on a rate of velocity reduction of the vehicle; and
    generating a pedal force input to the brake pedal to provide tactile feedback to a driver of the vehicle,
    wherein the pedal force input is generated based on a pedal force offset associated with the brake fade indication, and
    wherein the pedal force offset is applied between a trigger value and a cutoff value.

16. The method of claim 15, further comprising receiving an indication of brake pressure or brake torque applied by the braking system.

17. The method of claim 15, wherein the trigger value comprises the rate of velocity reduction being about 11 $m/s^2$ and the cutoff value comprises the rate of velocity reduction being about 23 $m/s^2$.

18. The method of claim 15, wherein generating the pedal force input comprises employing a rate of velocity reduction versus pedal travel table to generate the pedal force offset based on the rate of velocity reduction.

19. The method of claim 18, wherein the pedal force offset is determined based on force versus travel characteristics of the vehicle.

* * * * *

UNITED STATES PATENT AND TRADEMARK OFFICE
CERTIFICATE OF CORRECTION

| | |
|---|---|
| PATENT NO. | : 11,926,304 B2 |
| APPLICATION NO. | : 17/344434 |
| DATED | : March 12, 2024 |
| INVENTOR(S) | : David S. Patterson et al. |

It is certified that error appears in the above-identified patent and that said Letters Patent is hereby corrected as shown below:

On the Title Page

Please add item (73) assignee details, --Assignee: Ford Global Technologies, LLC, Dearborn, MI (US)--

Signed and Sealed this
Thirtieth Day of July, 2024

Katherine Kelly Vidal
*Director of the United States Patent and Trademark Office*